Figure 1:
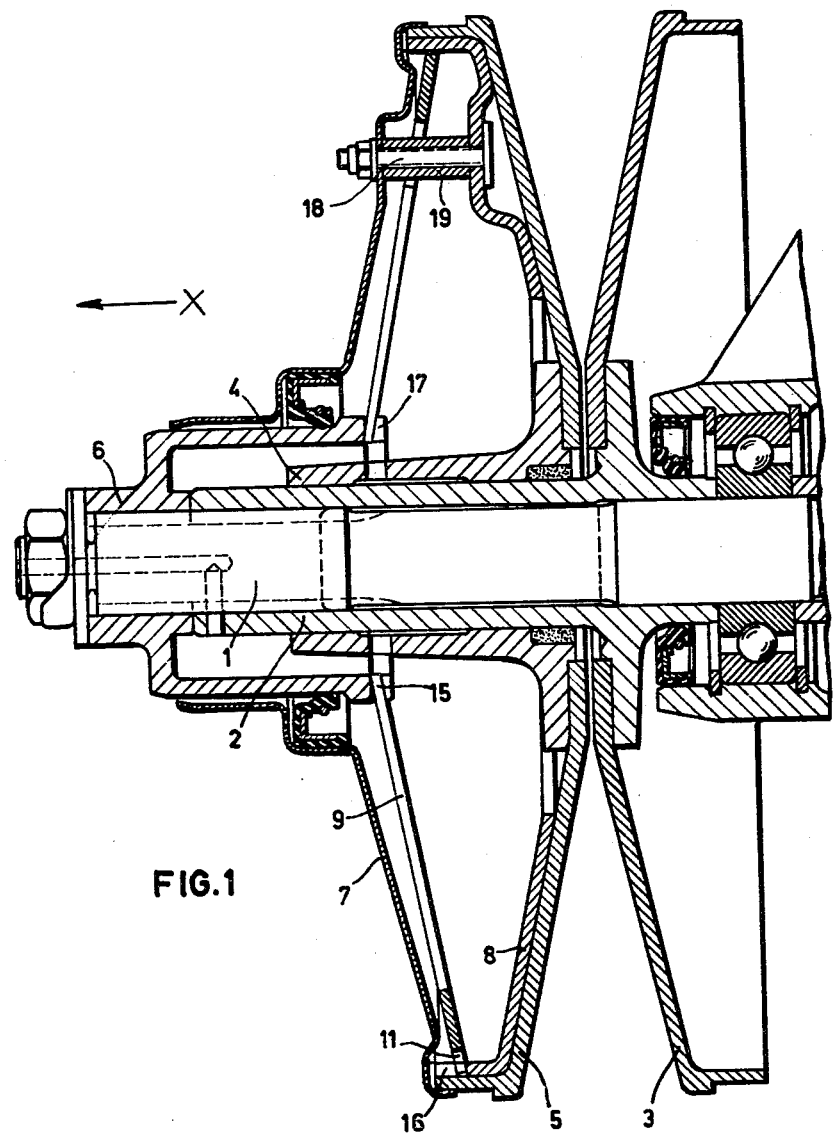

Oct. 30, 1962    J. VAN DER BRUGGHEN    3,060,759
DEVICE FOR TRANSMITTING A TORQUE BETWEEN TWO
MEMBERS WHICH ARE MUTUALLY SHIFTABLE
IN AXIAL DIRECTION
Filed Jan. 18, 1960    2 Sheets-Sheet 2
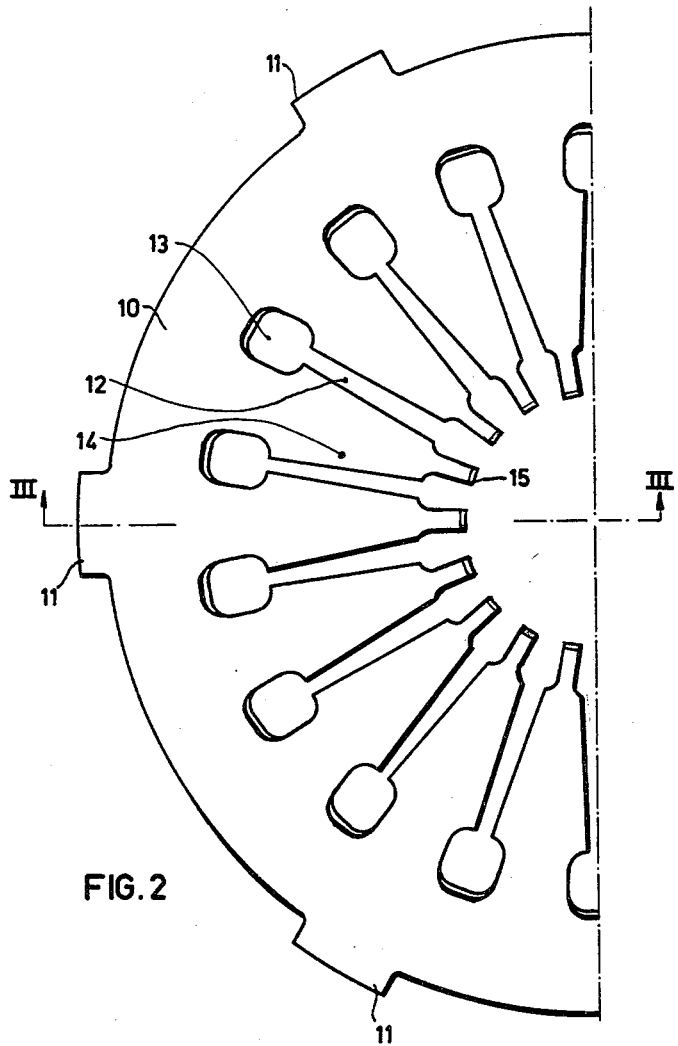
FIG. 2
FIG. 3
INVENTOR.
JOAN VAN DER BRUGGHEN
BY
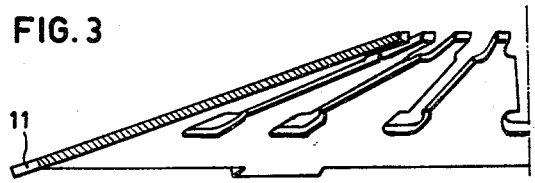
ATTYS.

3,060,759
DEVICE FOR TRANSMITTING A TORQUE BETWEEN TWO MEMBERS WHICH ARE MUTUALLY SHIFTABLE IN AXIAL DIRECTION
Joan van der Brugghen, Eindhoven, Netherlands, assignor to Van Doorne's Automobielfabriek N.V., Eindhoven, Netherlands, a limited liability company of the Netherlands
Filed Jan. 18, 1960, Ser. No. 9,152
Claims priority, application Netherlands Jan. 21, 1959
7 Claims. (Cl. 74—230.17)

The invention relates to a device for transmitting torque from a shaft, or a member fixed thereto, to a member, which is capable of axial displacement on said shaft.

Generally when transmitting torque, a device is used consisting of one or more cotters, keys, splines, pins which extend parallel to the shaft, or the like. Such devices have the disadvantage that, in operation, i.e. when torque is transmitted, a lateral pressure is exerted on said members, the resulting friction from which tends to resist relative axial displacement.

Although this difficulty occurs in a great variety of machines, its solutions, according to the invention will be described hereinafter with reference to an expanding pulley gear as used in a pair of belt-connected pulleys. Both as regards the primary (driving) pulley as well as the secondary (driven) pulley, the torque which is transmitted by the side of the belt to the movable half-pulley tends to resist shifting of the axially displaceable half-pulley due to the load on the members mentioned above. This phenomenon has a detrimental influence on the sensitivity of the automatic means, by which adjustment of the distance between both half-pulleys is effected. In order to decrease the friction it would be possible to use balls or the like, but this would render the construction complicated and expensive.

An object of the invention is to provide a torque transmitting device comprising a plurality of arms or a disc provided with arms and/or projections which interconnect the shaft, or the member fixed thereto, with the axially shiftable member in such a way that the arms or the projections of the disc are capable of flexing movements in axial planes.

By this flexing or resilient movement, sliding members for transmitting the torque are avoided since the torque is transmitted by parts which are free or substantially free from friction.

Another object of the invention is to provide an expanding belt pulley in which a torque transmitting device is constructed in the form of a cup-shaped spring. This has the advantage that the elastic pressure of both half-pulleys one towards the other, which is necessary in a variable diameter pulley, is exerted by the same member which transmits the torque without friction, so that no additional members are required.

The invention is illustrated in the accompanying drawings which show one embodiment of a torque transmitting device in accordance with the invention as applied to an expanding pulley.

In the drawings:
FIGURE 1 is an axial section of one part of a variable diameter pulley in which a cup-shaped spring according to the invention is applied.
FIGURE 2 is an end-on or axial view of a cup-shaped spring, and
FIGURE 3 is a section on the line III—III of FIGURE 2.

Mounted on a shaft 1 of an automatically variable diameter pulley or so-called "expanding-pulley" is a hub 2 which carries the non-shiftable or fixed pulley component 3. Associated with the component 3 is a second and shiftable component 5, fast on a hub 4, which is axially slidable on the hub 2. A cup-shaped cap fast on the extremity of the shaft 1 surrounds a portion of the hub 4 of the movable half-pulley 5, said cap being mounted on the same splines of the shaft as the hub 2 of the fixed half-pulley 3.

Fixed to the outer surface of the half-pulley 5 is a plate 8 and between the latter and a cover plate 7 is provided, in accordance with the invention, a cup-shaped spring 9, one half of which is shown in FIGURES 2 and 3. This cup-shaped spring consists of an annular-rim portion which is provided with circumferential projections 11.

Indentations or slots 12 extend radially inwards from the rim portion 10 towards the centre. Each slot has an enlarged opening 13 at the base forming a number of arms 14, which arms terminate at their inner extremities in cam fingers 15 arranged to lie on a circle concentric with the perimeter of the spring. As shown in FIGURE 1 the cup-shaped spring has the shape of a truncated cone.

Recesses 16 are formed in the perimeter of the plate 8, to accommodate the projections 11 of the spring 9 while the cam fingers 15 at the inner end of the arms 14 engage slots 17 in the end of the cap 6. Bolts 18, on which are spacing tubes 19, connect the outer cover plate 7 to the plate 8 and extend through the enlarged opening 13 in the spring 9.

Since the cup-shaped spring 9 is pre-stressed, it urges the half-pulley 5 in the direction of the fixed half-pulley 3. If in operation of the variable pulley, the half-pulley 5 is shifted to the left (direction of arrow $x$) against the action of the spring 9, the cam fingers 15 slide through the slots 17 in the cap 6, but the friction is so small that this has no influence on the operation of the variable pulley.

As applied to the primary or driving belt pulley, in which case the shaft 1 is the driving shaft, this shaft imparts drive to half-pulley 5 via the cap 6, the slots 17 and cam fingers 15, the arms 14, the rim portion 10, and from the projections 11 and recesses 16 and the plate 8. Alternatively where the invention is applied to the secondary pulley, the half pulley 5 transmits its movement to the shaft 1 via the same train of connections.

It should be noted that the cup-shaped spring 9 due to its constructions has a characteristic curve which during the greater part of its effective deformation is a degressive one.

In an alternative embodiment the spring 9 comprises an annular portion which is central and next to the cap 6 and is fixed thereto by means of cam fingers and recesses or in any other different way. The arms extend in that case outwardly and engage recesses or openings in or adjacent the circumference of the half-pulley 5, as will easily be understood with reference to the drawing, since all components, except the place of the annular portion 10 of the spring and of the slots 12, remain the same.

It is clear that the invention has numerous applications. The arms 14 may be replaced by separate spokes which in one way or another are fixed with their outer ends to the half-pulley 5. It is also possible to fix the inner ends of the spokes to the cap 6 in which case the outer ends slide through openings or recesses which are arranged in or adjacent the circumference of the half-pulley 5.

What I claim is:
1. A torque transmitting device comprising a rotatable shaft, a member rotatably mounted on and slidable in axial direction along said shaft, a spring disc having projections at its outer periphery connected to said member and having an annular opening forming its inner periphery, a plurality of arms formed in said disc terminating at said inner periphery in tongues of a constant width, said tongues being connected to said shaft so that a torque may be transmitted by said disc from said member to said shaft or vice versa.

2. A torque transmitting device as set forth in claim 1 wherein said spring disc in unstressed condition has the shape of a truncated cone.

3. A torque transmitting device comprising a rotatable shaft, a member rotatably mounted on and slidable in axial direction along said shaft, a spring disc having projections at its outer periphery slidably connected to said member and having an annular opening forming its inner periphery, a plurality of arms formed in said disc terminating at said inner periphery in tongues of a constant width, said tongues being slidably connected to said shaft so that a torque may be transmitted by said disc from said member to said shaft or vice versa.

4. A torque transmitting device comprising a rotatable shaft, a member rotatably mounted on and slidable in axial direction along said shaft, a spring disc of truncated form having projections upon its outer periphery connected to said member and having an annular opening forming its inner periphery, a plurality of slots extending radially from said inner periphery forming a plurality of arms, said arms at their inner ends having tongues of a constant width, said tongues being connected to said shaft so that a torque may be transmitted by said disc from said member to said shaft or vice versa.

5. An expandable V-pulley having a pulley half mounted rotatably on and displaceable axially along the shaft of said pulley, comprising a spring disc provided with projections at its outer periphery and with arms extending inwardly from a non-interrupted annular portion and having at their inner ends tongues of a constant width, said peripheral projections engaging recesses of the displaceable pulley half and said tongues engaging radial slots of a number secured to said shaft in such a manner that said tongues, during the axial displacement of said pulley half relatively to said shaft, slide without lateral play through said radial slots.

6. An expandable V-pulley having a pulley half mounted rotatably on and displaceable axially along the shaft of the pulley in axial direction comprising a spring disc which in unstressed condition has substantially the shape of a truncated cone having at its outer periphery recesses of a constant width and at its inner periphery incisions which extend to a non-interrupted annular portion, said incisions having such a shape that arms are formed which at their inner ends have fingers of a constant width which engage radial slots having the same width arranged in a member secured to the shaft of the pulley so that during an axial displacement of said pulley half relatively to said shaft said fingers slide without lateral play through said slots and exert an axial force on the bottom of said slots opposed to an axial force exerted on said displaceable pulley half by the peripheral portion of said spring disc.

7. An expandable V-pulley wherein one pulley half mounted rotatably on and is displaceable axially along the shaft of said pulley comprising a spring disc, means upon said spring disc connecting the outer periphery thereof to said displaceable half of said pulley, arms upon said disc extending inwardly from a non-interrupted annular portion, tongues of a constant width upon the inner ends of said arms, a member having slots secured to said shaft, said tongues engaging said slots so that said tongues during the axial displacement of said pulley half relative to said shaft slide without lateral play in said slots so that a torque may be transmitted by said disc from said member to said pulley half or vice versa.

References Cited in the file of this patent

UNITED STATES PATENTS

| | | |
|---|---|---|
| 2,020,637 | Fawick | Nov. 12, 1935 |
| 2,073,146 | Gardiner | Mar. 9, 1937 |
| 2,229,319 | Wesselhoff | Jan. 21, 1941 |
| 2,256,699 | Almen | Sept. 23, 1941 |
| 2,289,573 | Almen | July 14, 1942 |
| 2,607,235 | Ruegenberg | Apr. 19, 1952 |
| 2,630,897 | Porter | Mar. 10, 1953 |
| 2,855,767 | Ahlen | Oct. 14, 1958 |
| 2,924,108 | Maroldt | Feb. 9, 1960 |
| 2,952,453 | Haussermann | Sept. 13, 1960 |